March 14, 1950 W. H. SPITZKEIT 2,500,299
DEVICE FOR CONNECTING AND DISCONNECTING TWO MEMBERS
Filed June 11, 1947

Inventor
Walter H. Spitzkeit
By John H. Ruckman
Attorney

Patented Mar. 14, 1950

2,500,299

UNITED STATES PATENT OFFICE 2,500,299

DEVICE FOR CONNECTING AND DISCONNECTING TWO MEMBERS

Walter H. Spitzkeit, Gulfport, Miss.

Application June 11, 1947, Serial No. 753,998

2 Claims. (Cl. 287—103)

My invention relates to devices for connecting and disconnecting two members. An object of this invention is to provide a device of this character by means of which two members may be quickly connected and disconnected by a simple turning movement and without requiring the use of screws or other fasteners to firmly secure the two members to each other. While the device is susceptible for use with any two members which it is desired to connect and disconnect, it is intended more particularly for use with mannikins or display figures for attaching the hands to the arms thereof. In such use, it is frequently desirable to remove the hands from the arms in order that different dresses may be placed on the figure. Such dresses often have sleeves which are too small for drawing over the hands. When used for this purpose with mannikins, the device is located at the same relative position as that of the human wrist joint.

The novel features which I believe to be characteristic of this invention are set forth with particularity in the appended claims. The invention, however, both as to organization and operation, together with additional objects and advantages thereof will be best understood from the following description of a specific embodiment when read in connection with accompanying drawings in which, Fig. 1 is a view of the device partly in longitudinal section.

Figure 2:
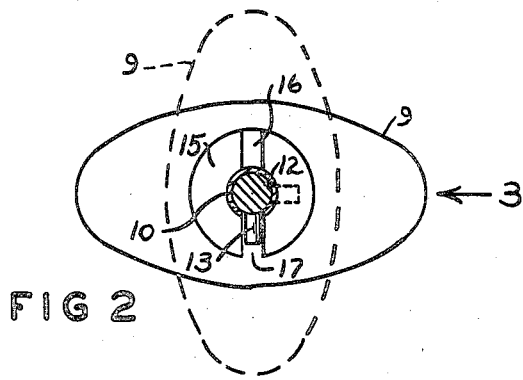
Fig. 2 is a view in section on the line 2—2 of Fig. 1.
Figure 3:
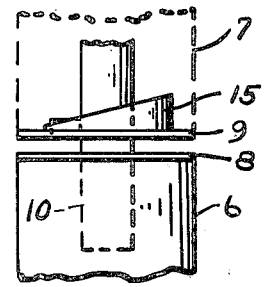
Fig. 3 is a view looking in the direction of the arrow 3 in Fig. 2.
Figure 4:
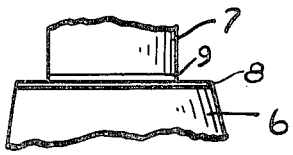
Fig. 4 is a fragmentary side view showing the two members completely attached to each other.

Referring to the drawings, the numerals 6 and 7 designate the two members which are to be connected and disconnected from each other. A disk 8 is secured in suitable manner to the end of the member 6 while a similar disk 9 is secured to the end of the member 7. These disks are preferably oval in shape as shown in Fig. 2. A tubular casing 10 is secured in the member 6 and extends out through a perforation in the center of the disk 8. The casing 10 contains a helical spring 11 which backs up a short plunger 12 from which a transverse pin 13 extends through a longitudinal slot 14 in the wall of the casing 10 thereby permitting the plunger 12 and its pin 13 to be pushed farther into the casing. The disk 9 on its outer surface carries an inclined member 15 which fits into a recess in the member 7 and which at its high point contains a slight depression 16 as shown in Fig. 2. The pin 13 is adapted to travel around on the incline 15 which has a slot 17 at its low point with which the pin 13 is adapted to register when in the relative position shown in Fig. 2 in full lines.

Figure 1:
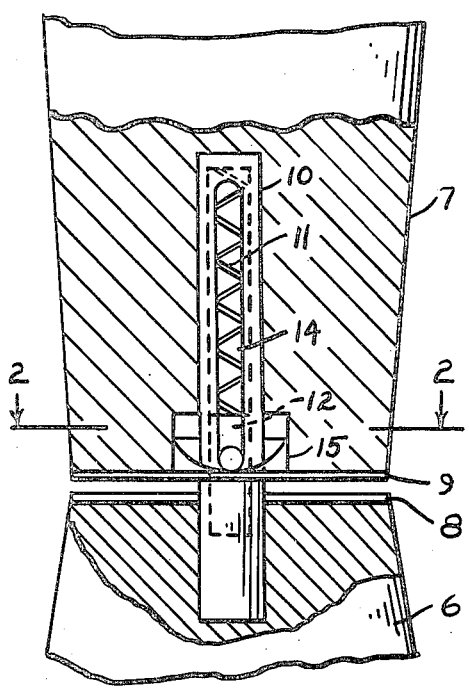
Figure 5:
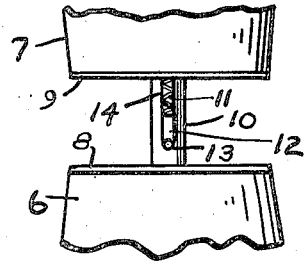
Fig. 5 is a view showing the two members partly separated.

The operation and advantages of my invention will be apparent in connection with the foregoing description and the accompanying drawings. When the members 6 and 7 are in the position shown in Figs. 1, 2 and 5, the pin 13 registers with the slot 17 and the members 6 and 7 can then be disconnected and separated from each other as indicated in Fig. 5. However when the members 6 and 7 are placed in the position shown in Fig. 1 and one of these members is given rotative movement through 180°, then the pin 13 will ride on the incline and finally enter the depression 16 thereby securing the two members to each other. Fig. 2 in dotted lines shows the pin 17 moved around through 90°. It is apparent that upon moving the pin 17 through another 90°, it will enter the depression 16. While this operation will result in firmly connecting the members 6 and 7, it will be understood that a turning movement of one of the members will readily move the pin out of the depression and bring it around into register with the slot 17 in the incline 15.

I claim:

1. In a device for connecting and disconnecting two members, the combination of a disk secured to each of the contiguous ends of said members respectively, said disks being of the same size and contour as each other and of the same size and contour as said ends of the members, a tubular casing secured in one of said members and extending out from the end of this member and through the disk secured thereto, said casing being adapted to extend into the other of said members through the disk secured thereto, said casing containing a longitudinal slot, a spring in said casing, a plunger in said casing backed up by said spring, a transverse pin extending out from said plunger and adapted to work in said slot, and an inclined member secured to the disk of said second member and upon which said inclined member, said pin is adapted to ride, said inclined member containing a slot in its lowest point with which said pin is adapted to register to permit connection and disconnection of said two members when one of them is rotated with relation to the other.

2. The combination set forth in the preceding claim, and said inclined member containing a depression in its high point for receiving said pin.

WALTER H. SPITZKEIT.

REFERENCES CITED

The following references are of record in the file of this patent:

UNITED STATES PATENTS

| Number | Name | Date |
|---|---|---|
| 205,922 | St. John | July 9, 1878 |
| 807,069 | Geoffroy | Dec. 12, 1905 |
| 2,355,922 | Minero | Aug. 15, 1944 |

FOREIGN PATENTS

| Number | Country | Date |
|---|---|---|
| 285,690 | Great Britain | Feb. 23, 1928 |
| 292,665 | Great Britain | June 19, 1928 |